United States Patent
Gotoh et al.

(10) Patent No.: US 9,505,398 B2
(45) Date of Patent: Nov. 29, 2016

(54) VEHICLE CONTROL APPARATUS

(71) Applicant: DENSO CORPORATION, Kariya, Aichi-pref. (JP)

(72) Inventors: Mutsuaki Gotoh, Chita-gun (JP); Takashi Satoh, Okazaki (JP); Masanori Sugiura, Chiryu (JP); Mitsuharu Higashitani, Anjo (JP); Mamoru Mabuchi, Kariya (JP); Motoyoshi Hatta, Kariya (JP); Hiroaki Ono, Tokoname (JP)

(73) Assignee: DENSO CORPORATION, Kariya (JP)

( * ) Notice: Subject to any disclaimer, the term of this patent is extended or adjusted under 35 U.S.C. 154(b) by 353 days.

(21) Appl. No.: 14/457,224

(22) Filed: Aug. 12, 2014

(65) Prior Publication Data
US 2015/0051776 A1 Feb. 19, 2015

(30) Foreign Application Priority Data

Aug. 19, 2013 (JP) .................. 2013-169549
Jan. 30, 2014 (JP) .................. 2014-15789

(51) Int. Cl.
*B60W 20/00* (2016.01)
*B60K 6/48* (2007.10)

(52) U.S. Cl.
CPC ............ *B60W 20/108* (2013.01); *B60W 20/15* (2016.01); *Y02T 10/6221* (2013.01); *Y02T 10/6286* (2013.01)

(58) Field of Classification Search
CPC .. B60W 20/15; B60W 20/108; B60W 10/26; B60W 20/13; Y02T 10/6286; Y02T 10/6221
USPC ........................ 701/22; 180/65.245
See application file for complete search history.

(56) References Cited

U.S. PATENT DOCUMENTS

| | | | |
|---|---|---|---|
| 5,786,640 A * | 7/1998 | Sakai | B60K 6/46 180/65.245 |
| 2004/0164616 A1 | 8/2004 | Obayashi et al. | |
| 2007/0145924 A1 | 6/2007 | Obayashi | |
| 2007/0205030 A1 | 9/2007 | Shibata et al. | |
| 2013/0158769 A1* | 6/2013 | Sawayama | B60K 6/48 701/22 |
| 2015/0025721 A1* | 1/2015 | Thompson | B60W 30/194 701/22 |
| 2015/0283995 A1* | 10/2015 | Murata | B60K 6/30 477/5 |

FOREIGN PATENT DOCUMENTS

| | | |
|---|---|---|
| JP | 2004-249900 | 9/2004 |
| JP | 2010-158966 | 7/2010 |

OTHER PUBLICATIONS

Gotoh, et al., U.S. Appl. No. 14/457,183, filed Aug. 12, 2014.

* cited by examiner

*Primary Examiner* — Tan Q Nguyen
(74) *Attorney, Agent, or Firm* — Nixon & Vanderhye PC

(57) ABSTRACT

A vehicle control apparatus computes a fuel consumption decrease or a fuel consumption increase for each of a plurality of travel modes. The vehicle control apparatus includes a control section that calculates an engine efficiency of an engine and an MG-INV efficiency which is a combined efficiency of a motor generator and an inverter. The engine efficiency is calculated based on an engine power and an ideal fuel consumption line. The MG-INV efficiency is calculated based on an MG power. As such, based on the engine efficiency and the MG-INV efficiency, the control section computes the per-unit-electric-power fuel consumption decrease or the per-unit-electric-power fuel consumption increase.

6 Claims, 15 Drawing Sheets

VEHICLE CONTROL APPARATUS

CROSS REFERENCE TO RELATED APPLICATION

The present application is based on and claims the benefit of priority of Japanese Patent Applications No. 2013-169549, filed on Aug. 19, 2013, and No. 2014-15789, files on Jan. 30, 2014, the disclosure of which are incorporated herein by reference.

TECHNICAL FIELD

The present disclosure generally relates to a vehicle control apparatus which controls a hybrid vehicle.

BACKGROUND INFORMATION

In recent years, hybrid vehicles powered by an engine and a motor have become popular due to environmental requirements such as low fuel consumption and low exhaust gas emissions. Hybrid vehicles may have several driving modes to switch between including (i) an engine travel mode, in which the vehicle travels on a drive power only from an engine, (ii) an EV travel mode, in which the vehicle travels on a drive power only from a motor generator, (iii) an MG assist mode, in which the vehicle travels on a drive power from both of the engine and the motor generator, and (iv) an engine generation mode, in which the engine is used to provide both drive power to the vehicle and generate electricity by using the motor generator.

For example, in a patent document 1 (i.e., Japanese Patent Laid-Open No. JP-2007-176270A), an operation of the motor generator for generating electricity and an operation of the motor generator for driving the vehicle are compared with each other, in order to determine which one of those two operations creates greater economic benefits than the other. Then, based on a comparison result, an instruction command for operating the motor generator in a more economic mode is sent to the motor generator.

However, the patent document 1 is silent about the economic benefits of the EV travel mode in which the vehicle travels only on drive power from the motor generator but not drive power from the engine.

SUMMARY

It is an object of the present disclosure to provide a vehicle control apparatus that is capable of calculating a per-unit-electric-power fuel consumption decrease or increase for a plurality of travel modes.

In an aspect of the present disclosure, a vehicle control apparatus which controls a hybrid vehicle includes an engine, a motor generator, an electricity storage part, an inverter, and a transmission. When the motor generator is connected to the engine, a rotation number of the motor generator is set to have a certain ratio to a rotation number of the engine. The electricity storage part receives and sends an electric power from/to the motor generator. The inverter is disposed on a path between the electricity storage part and the motor generator. The transmission converts a drive power from the engine and/or from the motor generator, and transmits the converted power to drive wheels (i.e., tires) in various speeds.

The vehicle control apparatus further includes an engine efficiency calculator, a MG-INV efficiency calculator, and an electric power efficiency calculator.

The engine efficiency calculator calculates an engine efficiency based on ideal fuel consumption information and an engine power, which is a drive power output from the engine.

The MG-INV efficiency calculator calculates an MG-INV efficiency, which is a combined efficiency of the motor generator and the inverter based on an MG power, which is a drive power being output from the motor generator.

The power efficiency calculator calculates a per-unit-electric-power fuel consumption decrease or a per-unit-electric-power fuel consumption increase for travel modes based on the engine efficiency and the MG-INV efficiency.

Further, the electric power efficiency calculator calculates the fuel consumption decrease or the fuel consumption increase based at least on one of the engine efficiency, the MG-INV efficiency, an efficiency of the electricity storage part, an efficiency of the transmission, an efficiency of a load on an accessory device that is powered by the electricity storage part or an accessory power source, or an efficiency of a converter that converts the electric power supplied from the electricity storage part to the load on the accessory device.

In addition, the electric power efficiency calculator calculates at least one of an EV effect, which is the fuel consumption decrease when a travel mode is an EV travel mode, in which the MG power is output as a requested drive power that is calculated based on driver operation information and vehicle speed information, an MG assist effect, which is the fuel consumption decrease when the travel mode is an MG assist mode, in which the MG power and the engine power are output as the requested drive power, or an engine generation cost, which is the fuel consumption increase when the travel mode is an engine generation mode, in which the requested drive power is output as the engine power and the engine power is used to drive the motor generator to generate electricity.

Moreover, a travel mode selector selects one of the travel modes as the travel mode based on (i) a calculation of the EV effect and the MG assist effect by the electric power efficiency calculator and (ii) a comparison between the EV effect and the MG assist effect.

Even further, an MG rotation number is a number of rotations of the motor generator, and the MG-INV efficiency calculator calculates (i) the MG rotation number based on an engine rotation number that is derived from the engine power and the ideal fuel consumption information, and (ii) the MG-INV efficiency based on the MG rotation number and the MG power.

Still further, the transmission is a continuously variable transmission.

In the present disclosure, the per-unit-electric-power fuel consumption decrease or per-unit-electric-power fuel consumption increase is calculated for every travel mode based on the engine efficiency and the MG-INV efficiency. Further, the engine efficiency is calculated based on the engine power, and the MG-INV efficiency is calculated based on the MG power. Namely, if an operation equation for calculating the engine efficiency from the engine power and an operation equation for calculating the MG-INV efficiency from the MG power are known in advance, as a map for example, based on the engine power, the per-unit-electric-power fuel consumption decrease or per-unit-electric-power fuel consumption increase is appropriately computable. In such manner, as compared with a case where an actual vehicle is used for an actual measurement, fuel consumption increase/decrease for every travel mode is computable with a simpler configuration.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
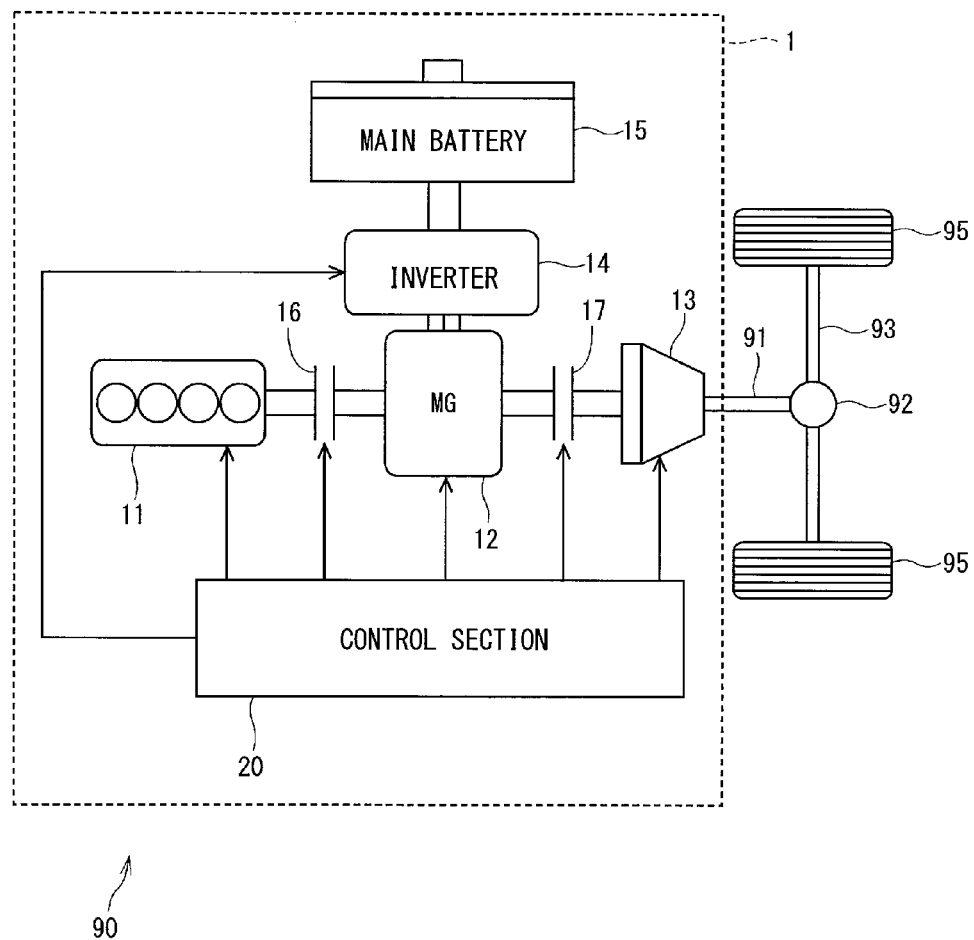
FIG. 1 is a block diagram of a vehicle control system in a first embodiment of the present disclosure.

Hereafter, the vehicle control apparatus by the present disclosure is described based on the drawing.

First Embodiment

The vehicle control apparatus in the first embodiment of the present disclosure is described based on FIGS. 1-11.

As shown in FIG. 1, a vehicle control system 1 is provided with an engine (ENG) 11, a motor generator (MG) 12, a transmission 13, an inverter (INV) 14, a main battery 15 as an electricity storage part, a first clutch 16, a second clutch 17, and a control section 20 as a vehicle control apparatus, together with other parts.

The engine 11 and the motor generator 12 constitute a drive power source of a vehicle 90 which is a hybrid vehicle. The engine 11 is an internal-combustion engine having two or more cylinders, and a drive power of the engine 11 is transmitted to the motor generator 12 via the first clutch 16.

The motor generator 12 serves as an electric motor for generating a torque by receiving an electric power from the main battery 15 and by rotating, and also serves as a generator for generating electric power by receiving an engine torque from the engine 11 or by receiving a regenerative energy from braking of the vehicle 90.

An engine rotation number Neng which is a number of rotations of the engine 11, and an MG rotation number Nmg which is a number of rotations of the motor generator 12 are set to have a preset ratio. In the present embodiment, the ratio of the MG rotation number Nmg against the engine rotation number Neng is 1. That is, in the present embodiment, the engine rotation number Neng and the MG rotation number Nmg are equal.

The drive power of the engine 11 and the motor generator 12 is transmitted to a drive shaft 91 via the second clutch 17 and the transmission 13. The drive power transmitted to the drive shaft 91 rotates a drive wheel 95 via a gear 92 and an axle 93. The transmission 13 of the present embodiment is a continuously variable transmission (CVT) which can continuously change speed, i.e., without going through a stepwise gear change.

The inverter 14 is disposed at a position between the motor generator 12 and the main battery 15, and converts the electric power of the main battery 15 into an AC electric power, and supplies it to the motor generator 12. Further, the inverter 14 converts the electric power generated by the motor generator 12 into a DC electric power, and supplies it to the main battery 15. The main battery 15 is a rechargeable secondary battery, such as a nickel hydride battery or a lithium ion battery, for example, and is set to be chargeable and dischargeable. The main battery 15 is charged and discharged with its state of charge (SOC) maintained within a predetermined range.

The first clutch 16 is disposed at a position between the engine 11 and the motor generator 12, and is set to connect and disconnect a connection between the engine 11 and the motor generator 12. The first clutch 16 is controlled by the control section 20 to disconnect the engine 11 and the motor generator 12 when a travel mode is in an EV travel mode which is mentioned later.

The second clutch 17 is disposed at a position between the motor generator 12 and the transmission 13, and is set to connect and disconnect the motor generator 12 and the transmission 13.

The control section 20 is a microcomputer or the like, and is provided with a CPU, ROM, RAM, I/O and a bus line for connecting those parts which are not illustrated. The control section 20 controls, through a software process by executing a program that is pre-memorized in the CPU and/or a hardware process by a dedicated electronic circuit, an entire vehicle 90 which is based on a control of the engine 11, the motor generator 12, the transmission 13, the inverter 14, the first clutch 16, and the second clutch 17 and the like.

Figure 2:
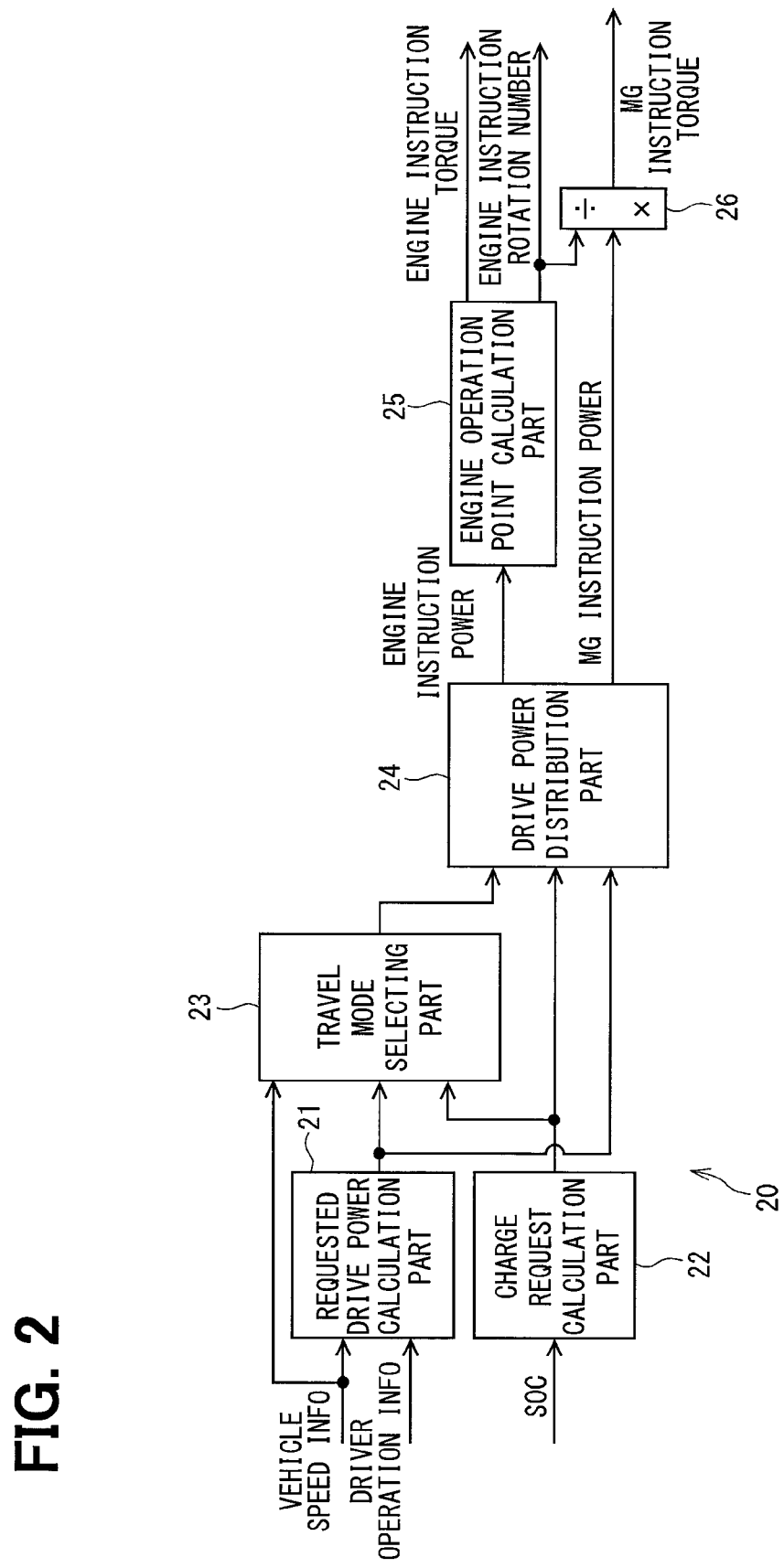
FIG. 2 is a block diagram of a vehicle control apparatus in the first embodiment of the present disclosure.

As shown in FIG. 2, the control section 20 has a requested drive power calculation part 21, a charge request calculation part 22, a travel mode selecting part 23, a drive power distribution part 24, an engine operation point calculation part 25, and an MG instruction torque calculation part 26 and the like.

The requested drive power calculation part 21 obtains driver operation information, including an accelerator opening etc. and vehicle speed information about a travel speed of the vehicle 90, and computes a requested drive power Pdrv. The requested drive power Pdrv is a power outputted to the drive shaft 91.

The charge request calculation part 22 computes whether a charge request exists based on an SOC of the main battery 15.

The travel mode selecting part 23 selects a travel mode. The travel mode may include: (i) an "engine travel mode" in which the vehicle travels by an engine power Peng which is a drive power outputted by the drive of the engine 11, (ii) an "EV travel mode" in which the vehicle travels by an MG power Pmg which is the drive power outputted by the drive of the motor generator 12, (iii) an "MG assist mode" in which the vehicle travels by the engine power Peng and the MG power Pmg, and (iv) an "engine generation mode" in which the vehicle travels by the engine power Peng and performs an electric power generation by the motor generator 12. In the present embodiment, the travel mode of the vehicle is arbitrarily switchable by controlling the drive of the engine 11, the drive of the motor generator 12, and the connection/disconnection of the first clutch 16.

According to the present embodiment, the travel mode is selected based on the vehicle speed information, the requested drive power Pdrv, whether the charge request has been placed, and a per-unit-electric-power fuel consumption reduction.

The details of selection of the travel mode and a calculation method of the per-unit-electric-power fuel consumption reduction are mentioned later.

In the drive power distribution part 24, an engine instruction power and an MG instruction power are computed based on the requested drive power Pdrv and the existence of a charge request according to the travel mode. In the EV travel mode, the requested drive power Pdrv is entirely distributed to and used as the MG instruction power. In the engine travel mode, the requested drive power Pdrv is entirely distributed to and used as the engine instruction power.

In the engine operation point calculation part 25, an operation point (i.e., a number of rotation, a torque) of the engine 11 is computed based on the engine instruction power. Since the transmission 13 of the present embodiment is a continuously variable transmission and a gear ratio of such mechanism can be freely and continuously set in a preset range, setting of the operation point of the engine 11 has a high degree of freedom. Therefore, in the present embodiment, the operation point of the engine 11 is controlled to fall on an ideal fuel consumption line by an adjustment of the engine power. That is, based on the engine instruction power, an engine instruction torque and an engine instruction rotation number are computed to have the operation point of the engine 11 on the ideal fuel consumption line. According to the present embodiment, an ideal fuel consumption line corresponds to "ideal fuel consumption information".

In the MG instruction torque calculation part 26, an MG instruction torque is computed based on the MG instruction power. Since the engine rotation number Neng is equal to the MG rotation number Nmg in the MG assist mode, an MG instruction rotation number is computed based on the engine instruction rotation number, and an MG instruction torque is computed based on the MG instruction rotation number and the MG instruction power.

Since the first clutch 16 separates the engine 11 and the motor generator 12 in the EV travel mode, the relationship between the engine rotation number Neng and the MG rotation number Nmg is lost. Therefore, for example, in outputting the MG power Pmg, the MG instruction torque is computed based on an operation point that maximizes an MG-INV efficiency $\eta$ ele, which is mentioned later. Further, the MG instruction torque may be so computed that the engine 11 and the motor generator 12 can shift appropriately to a clutch connected state in which the first clutch 16 connects the engine 11 and the motor generator 12.

Figure 3:
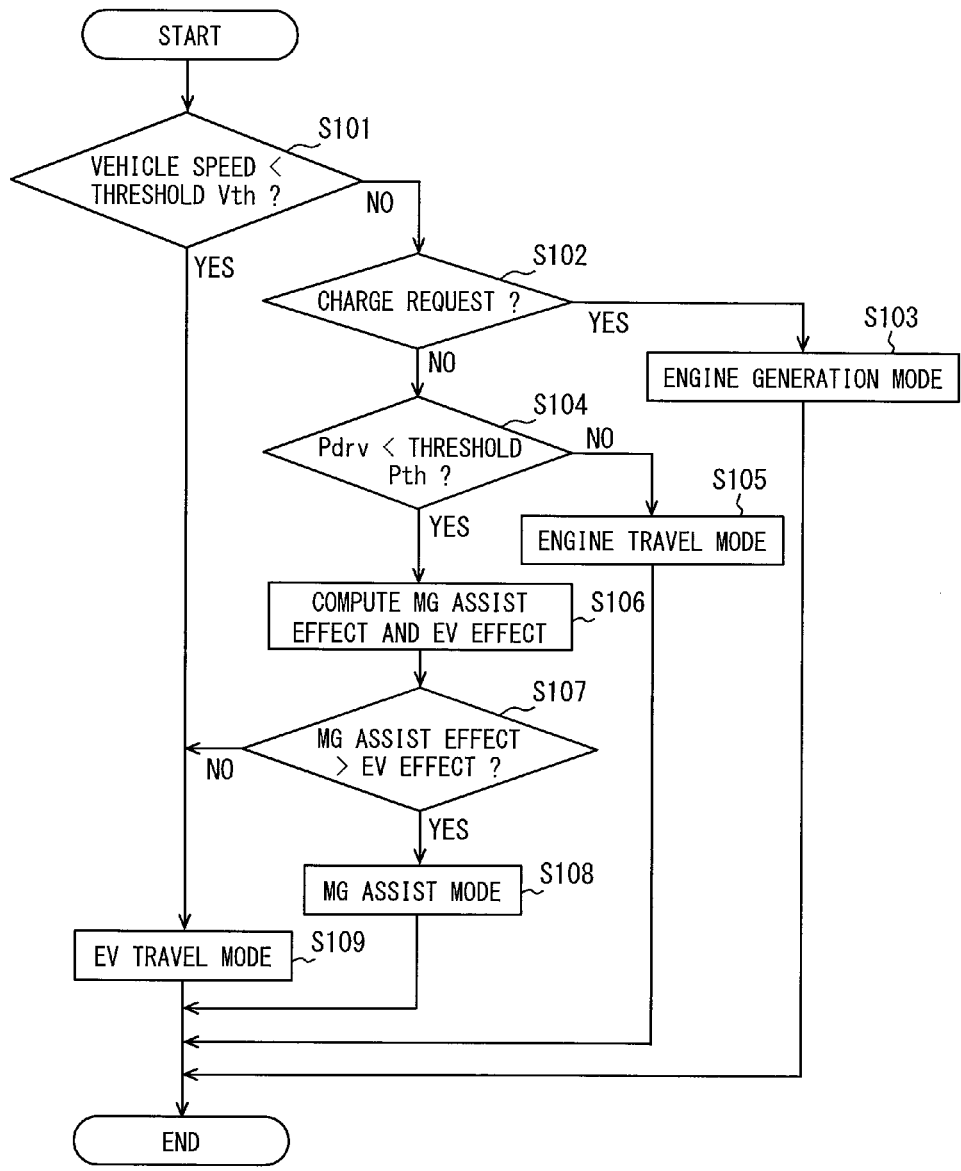
FIG. 3 is a flowchart of a travel mode selection process of a first embodiment of the present disclosure.

Here, a travel mode selection process by the travel mode selecting part 23 is described based on the flowchart shown in FIG. 3.

In the first step S101 (hereafter, a "step" is omitted and a sign "S" is used), it is determined whether a vehicle speed is smaller than an EV travel speed threshold Vth. When it is determined that the vehicle speed is smaller than the EV travel speed threshold Vth (S101:YES), the process shifts to S109. When the vehicle speed is determined to be equal to or greater than the EV travel speed threshold Vth (S101:NO), the process shifts to S102.

In S102, it is determined whether a charge request exists. When it is determined that there is no charge request (S102:NO), the process shifts to S104. When it is determined that a charge request exists (S102:YES), the process shifts to S103.

In S103, the travel mode is set to the engine generation mode.

In S104 which follows a no charge request determination (S102:YES), it is determined whether the requested drive power Pdrv is smaller than an engine travel drive power threshold Pth. When it is determined that the requested drive power Pdrv is smaller than the engine travel drive power threshold Pth (S104:YES), the process shifts to S106. When it is determined that the requested drive power Pdrv is equal to or greater than the engine travel drive power threshold Pth (S104:NO), the process shifts to S105.

In S105, the travel mode is set to the engine travel mode.

In S106 which follows a determination that the requested drive power Pdrv is smaller than the engine travel drive power threshold Pth (S104:YES), an MG assist effect and an EV effect are computed. Calculation of the MG assist effect and the EV effect is mentioned later.

In S107, it is determined whether the MG assist effect is greater than the EV effect. When it is determined that the MG assist effect is equal to or smaller than the EV effect (S107:NO), the process shifts to S109. When it is determined that the MG assist effect is greater than the EV effect (S107:YES), the process shifts to S108.

In S108, the travel mode is set to the MG assist mode.

In S109, which follows a determination that the vehicle speed is smaller than the EV travel speed threshold Vth (S101:YES) or a determination that the MG assist effect is equal to or smaller than the EV effect (S107:NO), the travel mode is set to the EV travel mode.

Next, a calculation method of a per-unit-electric-power fuel consumption decrease and a per-unit-electric-power fuel consumption increase is described. In the present embodiment, a per-unit-electric-power fuel consumption decrease in the EV travel mode is an "EV effect", a per-unit-electric-power fuel consumption decrease in the MG assist mode is an "MG assist effect", and a per-unit-electricpower fuel consumption increase in the engine generation mode is an "engine generation cost".

First, the engine efficiency η eng and the MG-INV efficiency η ele that are respectively used for the calculation of the EV assist effect, the MG assist effect, and the engine generation cost are described. The engine efficiency η eng is an efficiency of the engine 11 as a separate device (i.e., by itself or engine-only), and the MG-INV efficiency η ele is an efficiency of a combination of the motor generator 12 and the inverter 14.

Figure 4:
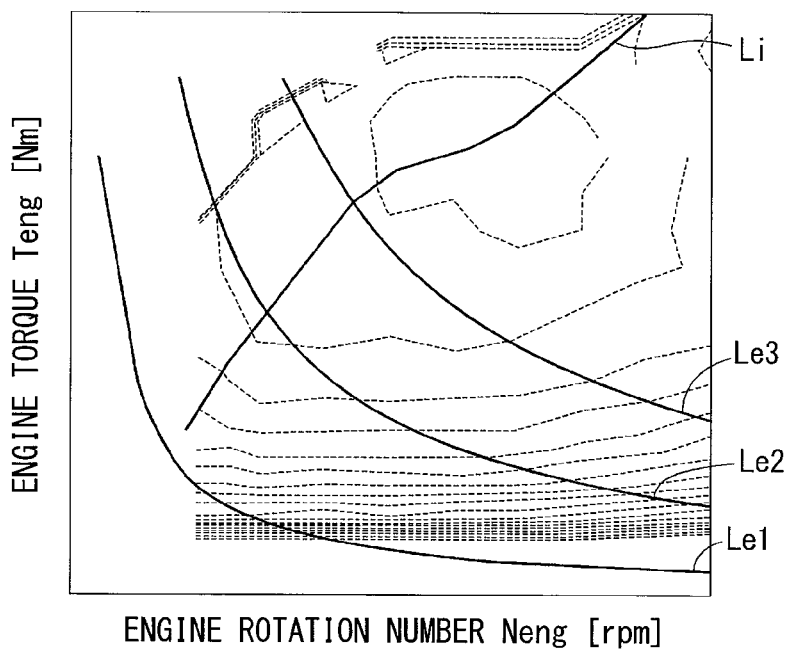
FIG. 4 is an illustration diagram of an ideal fuel consumption line of an engine in the first embodiment of the present disclosure.

FIG. 4 shows a contour line of a fuel consumption rate Ceng [g/h] in a diagram in which a horizontal axis is an engine rotation number Neng [rmp] and a vertical axis is an engine torque Teng [Nm]. Solid lines Le1, Le2, and Le3 are equi-power lines, which are connecting lines connecting equi-power points, i.e., points of the same engine power Peng. Further, a solid line Li is an ideal fuel consumption line which connects minimum fuel consumption points, i.e., the points on the equi-power lines where the fuel consumption rate Ceng falls to the minimum.

Figure 5:
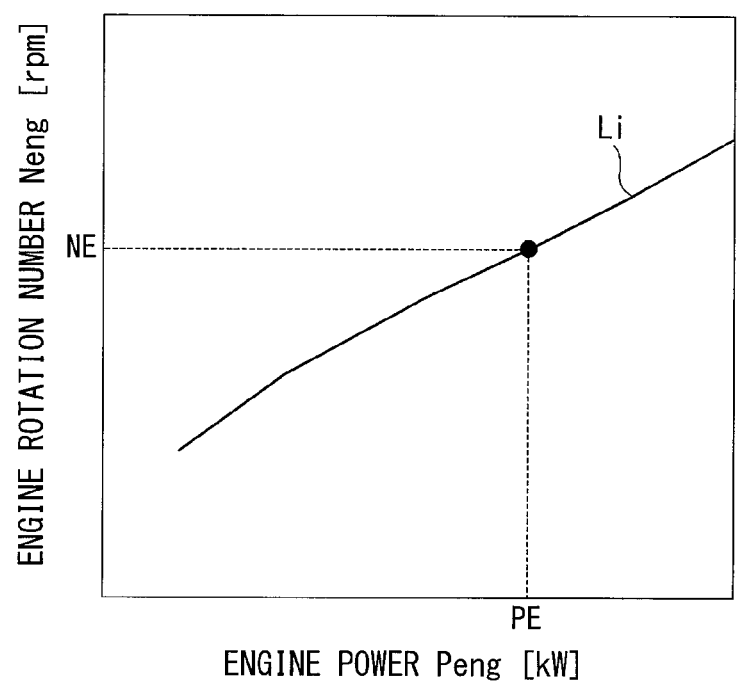
FIG. 5 is an illustration diagram of a relationship between an engine power and an engine rotation number on the ideal fuel consumption line of the engine in the first embodiment of the present disclosure.
Figure 6:
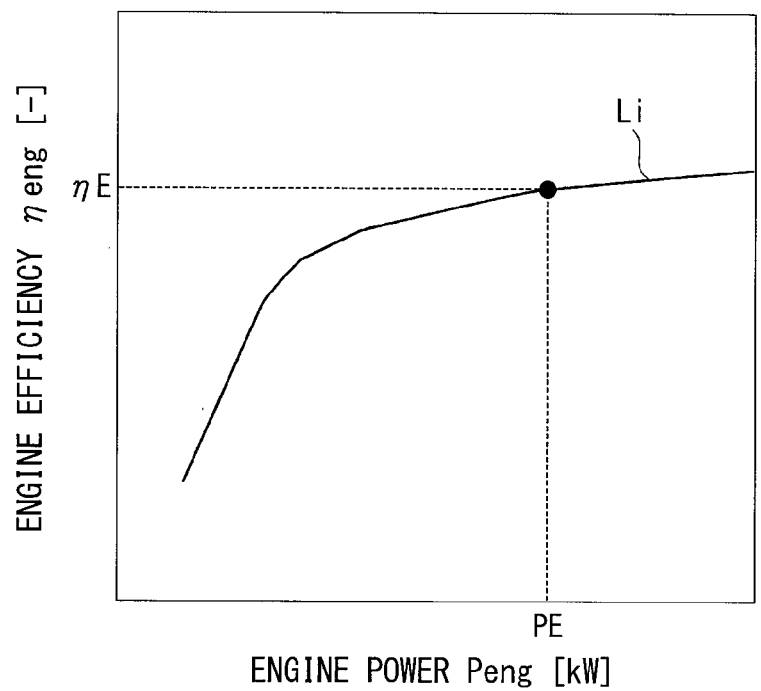
FIG. 6 is an illustration diagram of an engine efficiency on the ideal fuel consumption line of the engine in the first embodiment of the present disclosure.

FIG. 5 is a diagram of a relationship between the engine power Peng and the engine rotation number Neng based on the ideal fuel consumption line Li based on FIG. 4. FIG. 6 is a diagram of a relationship between the engine power Peng and the engine efficiency η eng based on the ideal fuel consumption line Li based on FIG. 4.

Since the engine 11 is controlled so that the operation points of the engine 11 fall on the ideal fuel consumption line Li in the present embodiment, once the engine power Peng is determined, the operation point is determined as a single point, thereby leading to a determination of the engine rotation number Neng. Further, as shown in FIG. 6, when the engine power Peng is determined, the engine efficiency η eng is computable.

Figure 7:
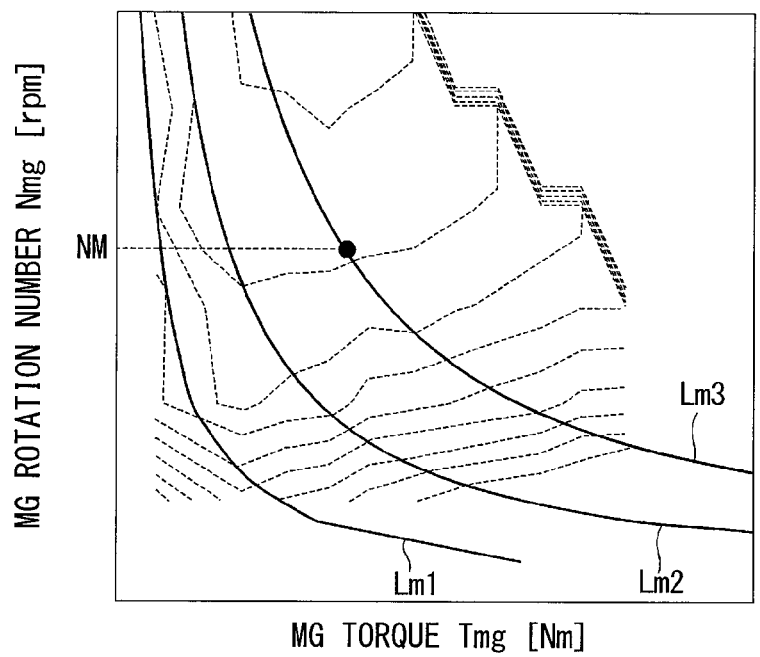
FIG. 7 is an illustration diagram of an MG-INV efficiency in the first embodiment of the present disclosure.

FIG. 7 shows a contour line (i.e., a broken line) of the MG-INV efficiency η [–] in a diagram in which a horizontal axis is an MG torque Tmg [Nm] and a vertical axis is an MG rotation number Nmg [rpm]. Solid line Lm1, Lm2, and Lm3 are equi-power lines, which are connecting lines connecting equi-power points, i.e., points of the same MG power Pmg.

In the present embodiment, the engine rotation number Neng is equal to the MG rotation number Nmg, when the engine rotation number Neng is determined, the MG rotation number Nmg is also determined. Further, since the engine rotation number Neng is determined based on the engine power Peng, it may also be stated that the MG rotation number Nmg is determined based on the engine power Peng.

Further, since the operation point is determined as a single point when the MG rotation number Nmg and the MG power Pmg are determined, with reference to a map of FIG. 7, the MG-INV efficiency η ele is computable.

More practically, when the engine power Peng is determined as PE as shown in FIG. 5, for example, the engine rotation number Neng is determined as NE. Further, as shown in FIG. 6, when the engine power Peng is determined as PE, the engine efficiency η eng is determined as η E.

Further, when the engine rotation number Neng is determined as NE, the MG rotation number Nmg is determined as a single value, i.e., as NM. Then, when the MG power Pmg and the MG rotation number Nmg are determined as shown in FIG. 7, the MG-INV efficiency η ele is determined as η M.

That is, in other words, when the engine power Peng and the MG power Pmg are determined, the engine efficiency η eng and the MG-INV efficiency η ele are computable.

Since the engine 11 and the motor generator 12 are separated by the first clutch 16 at the time of the EV travel, there is no relationship between the engine rotation number Neng and the MG rotation number Nmg.

Therefore, in the EV travel mode, the computation of the MG-INV efficiency η ele may be performed based on an assumption that the motor generator 12 is driven at the optimal efficiency points, where the MG-INV efficiency η ele rises to the optimal point on the equi-power line. Further, for the engine 11 and the motor generator 12 to be appropriately shifted to a clutch connected state by the connection of the first clutch 16, the motor generator 12 may be assumed to be driven at an operation point that is in consideration of the engine rotation number Neng, and the MG-INV efficiency η ele may be computed based on such an operation point.

Figure 8:
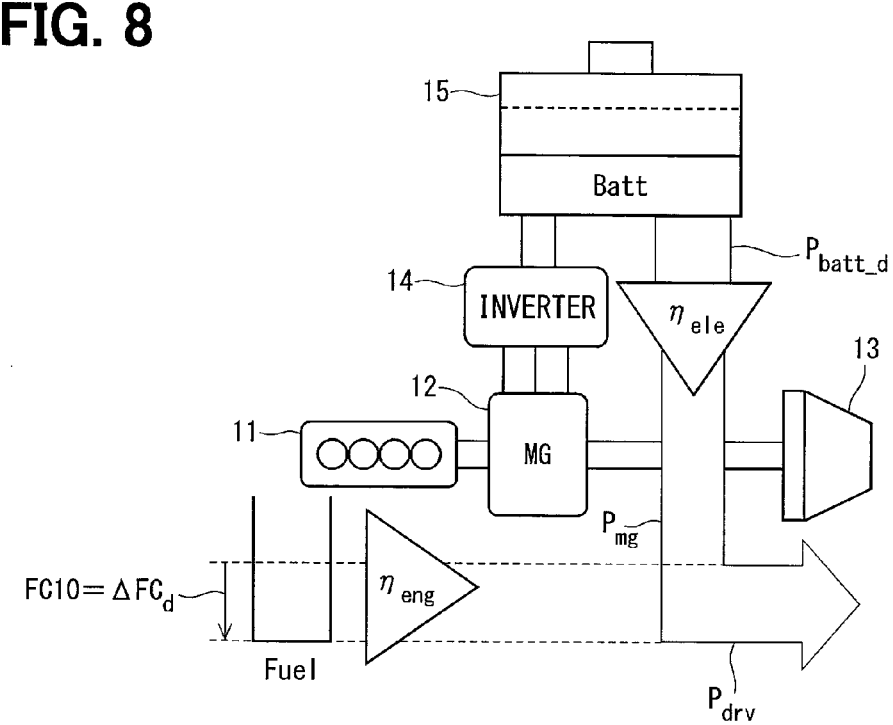
FIG. 8 is an illustration diagram of an EV effect in the first embodiment of the present disclosure.
Figure 9:
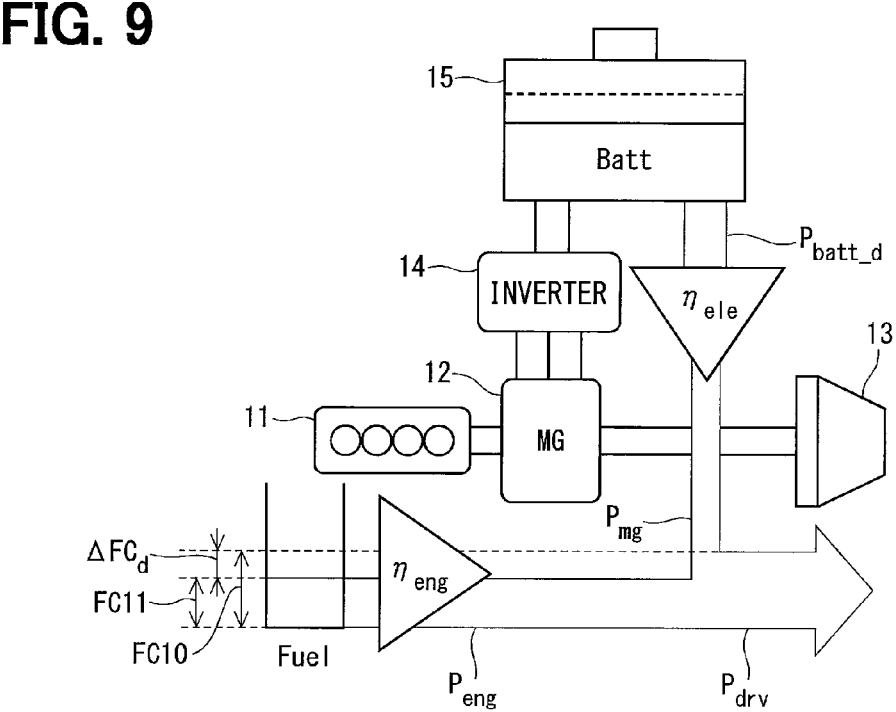
FIG. 9 is an illustration diagram of an MG assist effect in the first embodiment of the present disclosure.
Figure 10:
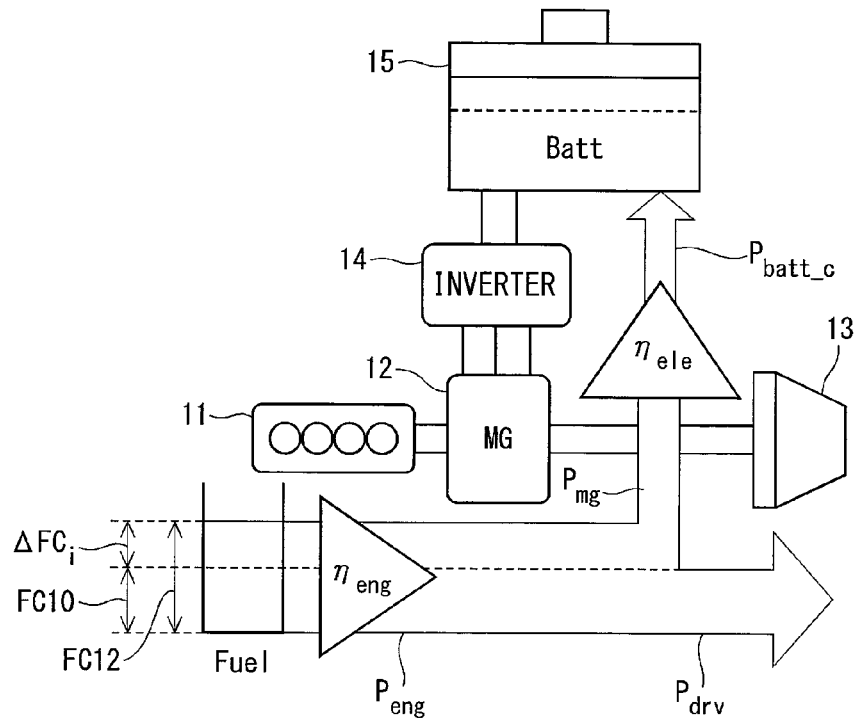
FIG. 10 is an illustration diagram of an electricity generation cost in the first embodiment of the present disclosure.

Then, the calculation methods of the EV effect, the MG assist effect, and the engine generation cost are described based on FIGS. 8-10. In FIGS. 8-10, the control section 20 is omitted from illustration. Hereafter, the per-unit-time fuel consumption decrease is designated as ΔFCd, and the per-unit-time fuel consumption increase is designated as ΔFCi.

FIG. 8 is a diagram illustrating the EV effect.

In the EV travel mode, the requested drive power Pdrv is provided as the MG power Pmg which comes from the motor generator 12 that is driven by the electric power of the main battery 15. Therefore, the requested drive power Pdrv is represented by an Equation (1) based on a consumed electric consumed electric power Pbatt_d [kW].

$$P_{drv} = P_{batt\_d} \times \eta_{ele}(P_{drv}) \quad \text{(Equation 1)}$$

The term "η ele (Pdrv)" in the Equation (1) is the MG-INV efficiency at the time of outputting the requested drive power Pdrv as the MG power Pmg from the motor generator 12, and is calculated from the map shown in FIG. 7. Hereafter, the term "η ele (Px)" is considered as the MG-INV efficiency at the time of outputting a power Px as the MG power Pmg from the motor generator 12, and is considered as a value calculated from the map shown in FIG. 7.

Further, in the EV travel mode, a fuel consumption FC10 in the case of providing the requested drive power Pdrv as the engine power Peng that is generated by the drive of the engine 11 is the fuel consumption decrease ΔFCd. When the requested drive power Pdrv is provided as the engine power Peng generated by the drive of the engine 11, the requested drive power Pdrv is represented by a following Equation (2).

$$P_{drv} = \Delta FC_d \times \rho \times \eta_{eng}(P_{drv}) \quad \text{(Equation 2)}$$

The term η eng (Pdrv) in the Equation (2) is the engine efficiency at the time of outputting the requested drive power Pdrv as the engine power Peng from the engine 11, and is calculated from the map shown in FIG. 6. Hereafter, "η eng (Py)" is considered as the engine efficiency at the time of outputting the power Py as the engine power Peng from the engine 11, and is considered as a value calculated from the map shown in FIG. 6.

Further, the term ρ [kJ/g] in the Equation (2) is a fuel energy density, and is a constant according to the kind of the fuel.

When the EV effect is defined by a following Equation (3), the EV effect is represented by an Equation (4) based on the Equations (1) and (2). From the Equation (4), the EV effect is computed based on the engine efficiency η eng and the MG-INV efficiency η ele.

$$EV \text{ effect}[g/s/kW] = \frac{\text{Per-unit-time fuel consumption decrease}[g/s]}{\text{Consumed electric power}[kW]} = \Delta FC_d / P_{batt\_d} \quad \text{Equation (3)}$$

$$\Delta FC_d / P_{batt\_d} = \eta_{ele}(P_{drv}) / \eta_{eng}(P_{drv}) \times 1/\rho \quad \text{Equation (4)}$$

FIG. 9 is a diagram illustrating the MG assist effect.

In the MG assist mode, the requested drive power Pdrv is provided as (i) the engine power Peng by the drive of the engine 11 and (ii) the MG power Pmg by the drive of the motor generator 12. In the present embodiment, prior to a distribution of the requested drive power Pdrv according to the travel mode in the drive power distribution part 24, a temporary distribution of the requested drive power Pdrv is performed by the travel mode selecting part 23 according to a map operation or the like, which distributes Pdrv into the engine power Peng and the MG power Pmg, for the calculation of the fuel consumption decrease ΔFCd.

The MG power Pmg is represented by an Equation (5) based on the consumed electric power Pbatt_d.

$$P_{mg} = P_{batt\_d} \times \eta_{ele}(P_{mg}) \qquad \text{Equation (5)}$$

In the MG assist mode, a difference between the fuel consumption FC10 and the fuel consumption FC11, i.e., (i) the fuel consumption FC10 in the case of outputting the requested drive power Pdrv entirely from the engine 11 and (ii) the fuel consumption FC11 in the case of outputting the engine power Peng from the engine 11 as a result of subtraction of the MG power Pmg outputted by the motor generator 12 from the requested drive power Pdrv, is the fuel consumption decrease ΔFCd.

The fuel consumption decrease ΔFCd is represented by a following Equation (6).

$$\Delta FC_d = \frac{P_{drv}}{\eta_{eng}(P_{drv})} \times \frac{1}{\rho} - \frac{P_{drv} - P_{mg}}{\eta_{eng}(P_{drv} - P_{mg})} \times \frac{1}{\rho}. \qquad \text{Equation (6)}$$

When the MG assist effect is defined by an Equation (7) just like the EV effect, the MG assist effect is represented by an Equation (8) based on the Equations (5) and (6). From the Equation (8), the MG assist effect is computed based on the engine efficiency η eng, the MG-INV efficiency η ele, the requested drive power Pdrv, and the MG power Pmg.

$$EV\ \text{effect}[g/s/kW] = \qquad \text{Equation (7)}$$
$$\frac{\text{Per-unit-time fuel consumption decrease}[g/s]}{\text{Consumed electric power}[kW]} =$$
$$\Delta FC_d / P_{batt\_d}$$

$$\frac{\Delta FC_d}{P_{batt\_d}} = \left\{ \frac{P_{drv}}{\eta_{eng}(P_{drv})} - \frac{P_{drv} - P_{mg}}{\eta_{eng}(P_{drv} - P_{mg})} \right\} \times \frac{\eta_{ele}(P_{mg})}{P_{mg} \times \rho} \qquad \text{Equation (8)}$$

FIG. 10 is a diagram illustrating the engine generation cost.

In the engine generation mode, a part of the engine power Peng is used for the drive of the motor generator 12, and the electric power generated by the drive of the motor generator 12 is supplied to the main battery 15 via the inverter 14, and the main battery 15 is charged. A charge electric power Pbatt_c that is charged to the main battery 15 is represented by a following Equation (9).

$$P_{batt\_c} = P_{mg} \times \eta_{ele}(P_{mg}) \qquad \text{Equation (9)}$$

In the engine generation mode, a difference between (i) the fuel consumption FC10 in the case of outputting the requested drive power Pdrv from the engine 11 and (ii) a fuel consumption FC12 in the case of outputting the MG power Pmg in addition to the requested drive power Pdrv from the engine 11 is a fuel consumption increase ΔFCi.

The fuel consumption increase ΔFCi is represented by a following Equation (10).

$$\Delta FC_i = \frac{P_{drv}}{\eta_{eng}(P_{drv})} \times \frac{1}{\rho} + \frac{P_{drv} + P_{mg}}{\eta_{eng}(P_{drv} + P_{mg})} \times \frac{1}{\rho} \qquad \text{Equation (10)}$$

When the engine generation cost is defined by a following Equation (11), the engine generation cost is represented by a following Equation (12) based on the Equations (9) and (10). The engine generation cost is computed in the same manner as the MG assist effect by a following Equation (12) based on the engine efficiency η eng, the MG-INV efficiency η ele, the requested drive power Pdrv, and the MG power Pmg.

$$\text{Engine generation cost}[g/s/kW] = \qquad \text{Equation (11)}$$
$$\frac{\text{Per-unit-time fuel consumption increase}[g/s]}{\text{Charge electric power}[kW]} =$$
$$\Delta FC_i / P_{batt\_c}$$

$$\frac{\Delta FC_i}{P_{batt\_c}} = \qquad \text{Equation (12)}$$
$$\left\{ -\frac{P_{drv}}{\eta_{eng}(P_{drv})} + \frac{P_{drv} + P_{mg}}{\eta_{eng}(P_{drv} + P_{mg})} \right\} \times \frac{1}{P_{mg} \times \eta_{ele}(P_{mg}) \times \rho}$$

The Equations (4), (8) and (12) are represented by the engine efficiency η eng and the MG-INV efficiency η ele which are computed based on the engine power.

That is, in other words, the EV effect, the MG assist effect, and the engine generation cost are computable based on the engine efficiency η eng and the MG-INV efficiency η ele.

Further, in the EV travel mode, a following Equation (13) is valid.

$$P_{drv} = P_{mg} \qquad \text{Equation (13)}$$

That is, in other words, the EV effect may be computed based on the requested drive power Pdrv or the MG power Pmg based on the Equation (4).

Further, a following Equation (14) is valid in the MG assist mode.

$$P_{drv} = P_{eng} + P_{mg} \qquad \text{Equation (14)}$$

Further, a following Equation (15) is valid in the engine generation mode.

$$P_{drv} = P_{eng} - P_{mg} \qquad \text{Equation (15)}$$

One of the requested drive power Pdrv, the engine power Peng, and the MG power Pmg is convertible from the other two based on the Equations (14) and (15).

Further, with reference to the Equations (8) and (12), the MG assist effect and the engine generation cost are computed based on at least two of the requested drive power Pdrv, the engine power Peng, and the MG power Pmg.

The EV effect and the MG assist effect are fuel consumption decrease indicators, which respectively indicate a greater fuel consumption decrease when their values are larger. Therefore, in the present embodiment, after computing the EV effect and the MG assist effect, (i) when the MG assist effect is greater than the EV effect (S105:YES in FIG. 3), the travel mode is shifted into the MG assist mode, and (ii) when the EV effect is equal to or greater than the MG assist effect (S105:NO), the travel mode is shifted into the EV travel mode. In such manner, the electrical energy of the main battery 15 is used highly efficiently, and the fuel consumption is decreased.

Figure 11:
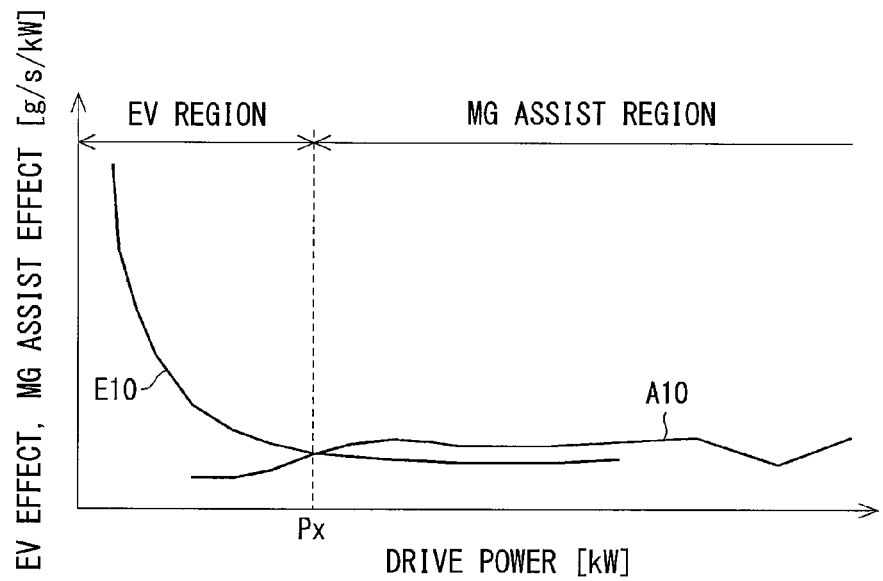
FIG. 11 is an illustration diagram of a relationship between the EV effect and the MG assist effect in the first embodiment of the present disclosure.

A concrete example of the EV effect and the MG assist effect is shown in FIG. 11.

In FIG. 11, assuming that the MG power Pmg from the motor generator 12 is constant, a solid line E10 represents the EV effect, and a solid line A10 represents the MG assist effect.

As shown in FIG. 11, when the requested drive power Pdrv is below Px, the EV effect is greater than the MG assist effect. When an "EV region" is defined as a region where the EV effect is greater than the MG assist effect, a greater fuel consumption decrease effect is expected from the EV travel mode travel than from the MG assist mode travel, based on an assumption that the same amount of electric power is consumed, which results in a lower fuel consumption for the same distance of travel. Therefore, in the EV region, the EV travel mode is selected.

When the requested drive power Pdrv is greater than Px, the MG assist effect is greater than the EV effect. When an "MG assist region" is defined as a region where the MG assist effect is greater than the EV effect, a greater fuel consumption decrease effect is expected from the MG assist mode travel than from the EV travel mode travel, based on an assumption that the same amount of electric power is consumed, which results in a lower fuel consumption for the same distance of travel. Therefore, in the MG assist region, the MG assist mode is selected.

As fully described in the above, the control section 20 of the present embodiment controls the vehicle 90 which is a hybrid vehicle having the engine 11, the motor generator 12, the main battery 15, the inverter 14, and the transmission 13. The motor generator 12 rotates at a preset ratio relative to the engine rotation number Neng, when connected to the engine 11. The main battery 15 delivers and receives the electric power to and from the motor generator 12. The inverter 14 is disposed at a position between the main battery 15 and the motor generator 12. The transmission 13 changes speed and transmits the drive power of the engine 11 and the motor generator 12 to the driving wheel 95.

The following processes are performed in the travel mode selecting part 23.

Based on the engine power Peng which is the drive power outputted from the engine 11 and the ideal fuel consumption line which indicates ideal fuel consumption information, the engine efficiency $\eta$ eng for the engine 11 by itself is computed. Further, based on the MG power Pmg which is the drive power outputted from the motor generator 12, the MG-INV efficiency $\eta$ ele which is a total efficiency of the motor generator 12 and the inverter 14 is computed. Then, based on the engine efficiency $\eta$ eng and the MG-INV efficiency $\eta$ ele, the per-unit-electric-power fuel consumption decrease $\Delta$FCd or the per-unit-electric-power fuel consumption increase $\Delta$FCi is computed for every travel mode.

According to the present embodiment, based on the engine efficiency $\eta$ eng and the MG-INV efficiency $\eta$ ele, the per-unit-electric-power fuel consumption decrease $\Delta$FCd or the per-unit-electric-power fuel consumption increase $\Delta$FCi is computed for every travel mode. Further, the engine efficiency $\eta$ eng is computed based on the engine power Peng, and the MG-INV efficiency $\eta$ ele is computed based on the MG power Pmg. Namely, if mapping equations for computing the engine efficiency $\eta$ eng from the engine power Peng and for computing the MG-INV efficiency $\eta$ ele from the MG power Pmg are known, based on the engine power, the per-unit-electric-power fuel consumption decrease $\Delta$FCd or the per-unit-electric-power fuel consumption increase $\Delta$FCi is appropriately computable.

Further, the fuel consumption decrease $\Delta$FCd or the fuel consumption increase $\Delta$FCi for every travel mode may be computed based on a measurement of an actual travel of the vehicle, such an actual measurement demands time and special equipment, in addition to the control of many emission parameters and the like that affect the load of the accessory devices, for the improved accuracy.

On the other hand, in the present embodiment, the fuel consumption decrease $\Delta$FCd or the fuel consumption increase $\Delta$FCi for every travel mode is computed based on the engine power, the fuel consumption decrease $\Delta$FCd for every travel mode or the fuel consumption increase $\Delta$FCi can be computed with a more simple configuration compared with the actual measurement case and without using an actual vehicle.

In the travel mode selecting part 23, at least one of the EV effect, the MG assist effect, and the engine generation cost is computed.

The EV effect is the fuel consumption decrease $\Delta$FCd in case that the travel mode is the EV travel mode in which the requested drive power Pdrv is computed based on driver operation information and vehicle speed information is output as the MG power Pmg.

The MG assist effect is the fuel consumption decrease $\Delta$FCd in case that the travel mode is the MG assist mode in which the requested drive power Pdrv is output as a combination of the engine power Peng and the MG power Pmg.

The engine generation cost is the fuel consumption increase $\Delta$FCi in case that the travel mode is the engine generation mode in which the requested drive power Pdrv is output as the engine power Peng and the engine power Peng is used for the drive of the motor generator 12 for generating the electric power.

Further, by computing the EV effect and the MG assist effect, the travel mode is determined based on the comparison result between the EV effect and the MG assist effect. That is, the travel mode is selected for maximizing the fuel consumption decrease effect and for raising the efficiency of the use of the electric energy. Such a selection of the travel mode improves the fuel consumption efficiency.

In the travel mode selecting part 23, the MG rotation number Nmg which is the number of rotation of the motor generator 12 is computed from the engine rotation number Neng that is computed based on the engine power Peng and the ideal fuel consumption information, and the MG-INV efficiency $\eta$ ele is computed based on the computed MG rotation number Nmg and the MG power Pmg.

In the present embodiment, when the vehicle is traveling in a mode other than the EV travel mode, the MG rotation number Nmg is uniquely determined based on the engine rotation number Neng, indicating that the MG rotation number Nmg is determined by the engine power Peng. Therefore, when the engine power Peng and the MG power Pmg are both determined, the MG-INV efficiency is appropriately computable.

In the present embodiment, the transmission 13 is a continuously variable transmission. Thereby, the operation point of the engine 11 is controllable to fall on the ideal fuel consumption line, enabling the improvement of the fuel consumption efficiency.

In the present embodiment, the travel mode selecting part 23 corresponds to an "engine efficiency calculator", an "MG-INV efficiency calculator", a "power efficiency calculator", and a "travel mode selector".

Further, S108 in FIG. 3 corresponds to a process that provides a function of an "engine efficiency calculator", an "MG-INV efficiency calculator", and a "power efficiency calculator", and S110 and S111 in FIG. 3 correspond to a process that provides a function of a "travel mode selector".

Second Embodiment

The vehicle control apparatus in the second embodiment of the present disclosure is described based on FIGS. 12-21.

Figure 12:
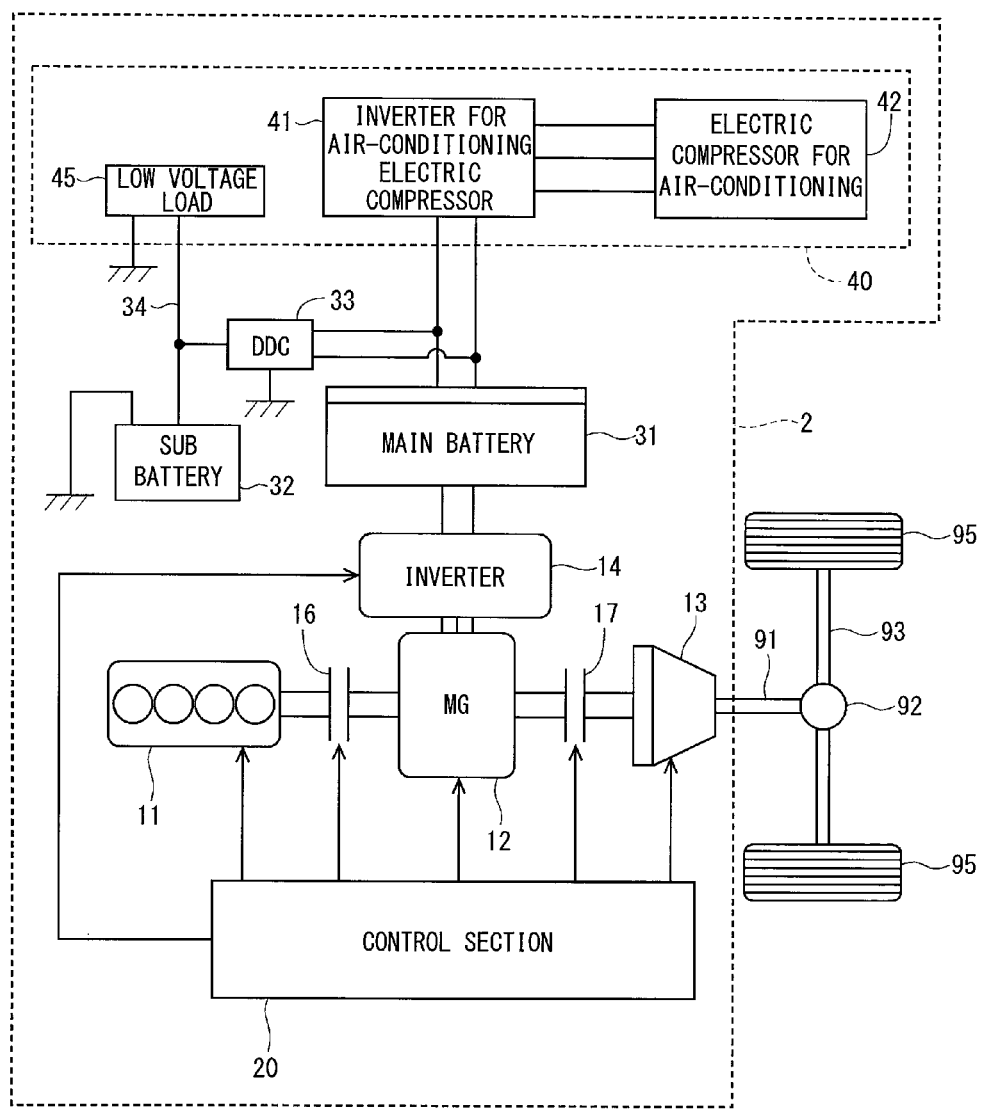
FIG. 12 is a block diagram of the vehicle control system in a second embodiment of the present disclosure.

As shown in FIG. 12, a vehicle control system 2 of the present embodiment includes the engine 11, the motor generator 12, the transmission 13, the inverter 14, the first clutch 16, the second clutch 17, and a control unit 20 that serves as a vehicle control apparatus, as well as including a main battery 31 that serves as an electricity storage part, a sub battery 32 as an accessory device power supply, a DC/DC converter 33 as a converter, and an accessory load 40 and the like.

The main battery 31 is substantially the same as the main battery 15 of the above-mentioned embodiment, and is connected, in addition to the connection to the inverter 14, to the motor generator 12, the DC/DC converter 33 and an inverter 41 for an air-conditioning electric compressor.

The sub battery 32 is a low voltage battery (e.g., 12 [V]) as compared with the voltage of the main battery 31 (e.g., 200 [V]), and supplies an electric power to a low voltage load 45 via a low voltage power line 34.

The DC/DC converter 33 is disposed at a position between the main battery 31 and the low voltage power line 34, and it converts the voltage of the main battery 31 so that the electric power is supplied to the low voltage power line 34.

The accessory load 40 comprises an inverter 41 for an air-conditioning electric compressor (henceforth designated as an "A/C inverter"), an air-conditioning electric compressor 42, and the low voltage load 45 and the like.

Hereafter, an electric power supplied to the accessory load 40 is designated as an "accessory device requested power".

The A/C inverter 41 is disposed at a position between the air-conditioning electric compressor 42 and the main battery 31, and converts the electric power of the main battery 31 into the AC power, and supplies the converted power to the air-conditioning electric compressor 42.

The air-conditioning electric compressor 42 is applied to a heat pump system which is not illustrated, for compressing and heating of the refrigerant and for sending the heated refrigerant to a non-illustrated indoor heat exchanger.

The low voltage load 45 may be various devices driven by the low voltage, such as an air-conditioning blower, a head lamp, and a seat heater, for example.

The EV effect as well as the MG assist effect and the engine generation cost are respectively indicators of the fuel consumption efficiency of the subject vehicle. Those indicators are under the influence of the engine efficiency η eng and the MG-INV efficiency η ele, and are further influenced by a capacity of the main battery 31, a performance of the transmission 13, and the accessory load 40 other than the motor generator 12 for the air-conditioning.

Therefore, in the present embodiment, the EV effect, the MG assist effect, and the engine generation cost are computed in consideration of a battery efficiency η batt which is an efficiency of the main battery 31, a transmission efficiency η trm which is an efficiency of the transmission 13, an air-conditioning efficiency η ac, and a DDC efficiency η ddc which is an efficiency of the DC/DC converter 33, in addition to the consideration of the engine efficiency η eng and the MG-INV efficiency η ele. According to the present embodiment, the air-conditioning efficiency η ac corresponds to an "efficiency of the accessory load", and the DDC efficiency η ddc corresponds to an "efficiency of the converter".

Here, the calculation methods of the battery efficiency η batt, the transmission efficiency η trm, the air-conditioning efficiency η ac, and the DDC efficiency η ddc are described.

Figure 13:
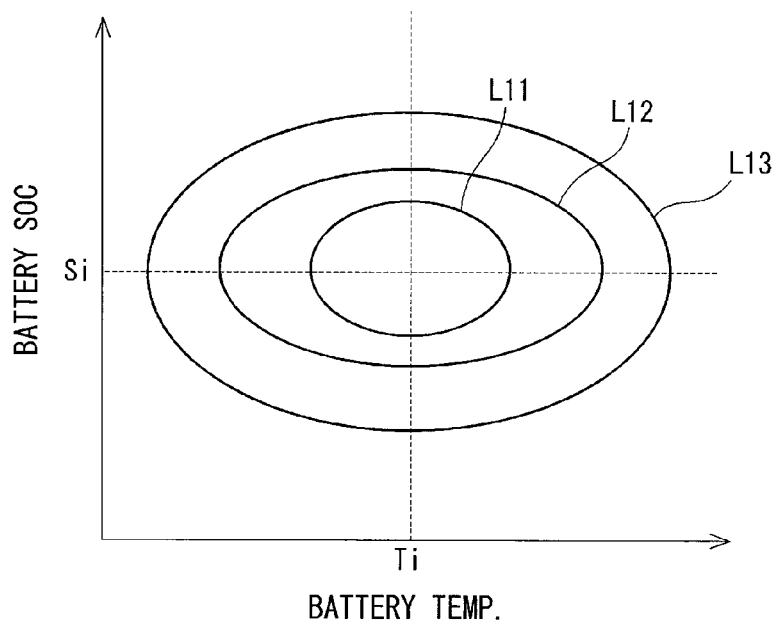
FIG. 13 is an illustration diagram of a battery efficiency in a second embodiment of the present disclosure.

The battery efficiency η batt is described based on FIG. 13. FIG. 13 shows a map by which a relationship between (i) the temperature and SOC of the main battery 31 and (ii) the battery efficiency η batt is depicted.

Solid lines L11, L12, and L13 in FIG. 13 are equi-efficiency lines, among which the line L11 corresponds to the highest efficiency and the lines L12, L13 correspond to the subsequently lower efficiencies. That is, in the main battery 31, the battery efficiency η batt decreases as the battery temperature departs from an optimal temperature Ti. Further, in the main battery 31, the battery efficiency η batt decreases as the SOC separates from an optimal SOC value Si.

According to the present embodiment, with reference to the map shown in FIG. 13, the battery efficiency η batt is computed based on the temperature and SOC of the main battery 31.

Figure 14:
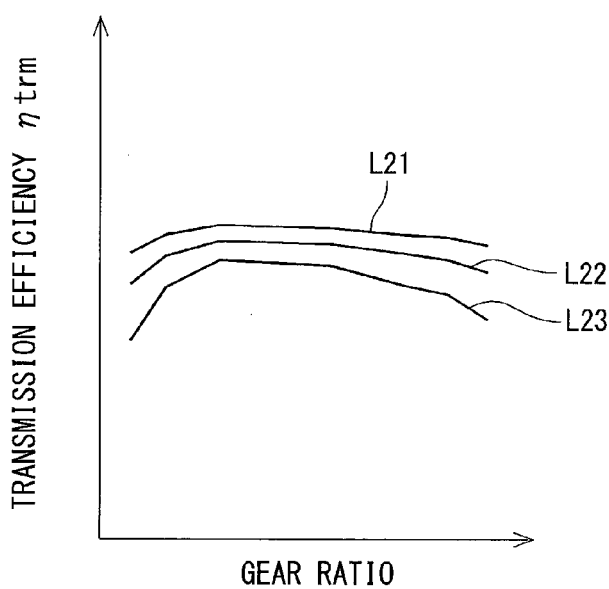
FIG. 14 is an illustration diagram of a transmission efficiency in the second embodiment of the present disclosure.
Figure 15:
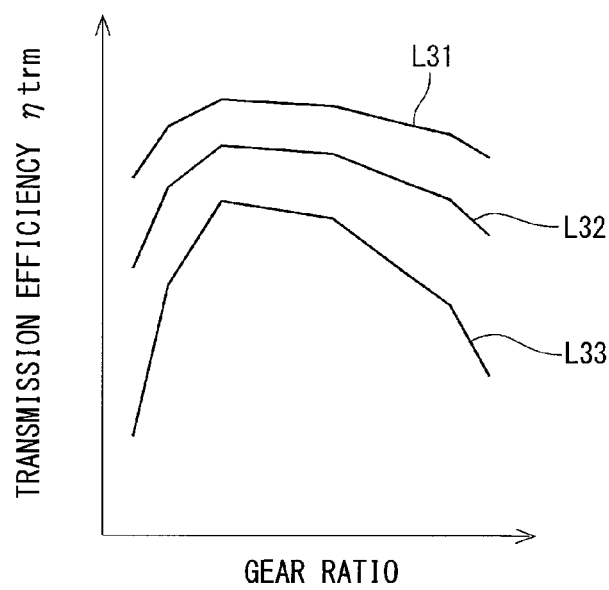
FIG. 15 is an illustration diagram of the transmission efficiency in the second embodiment of the present disclosure.

The transmission efficiency η trm is described based on FIGS. 14 and 15.

FIG. 14 shows a map by which a relationship between (i) a gear ratio and an input torque of the transmission 13 and (ii) the transmission efficiency η trm is depicted. As shown in FIG. 14, the transmission efficiency η trm changes according to a change of the gear ratio. Further, solid lines L21, L22, and L23 are input torques from higher to lower in a descending order. That is, the transmission efficiency η trm decreases as the input torque becomes small.

FIG. 15 shows a map by which a relationship between (i) the gear ratio of the transmission 13 and the temperature of a cooling oil which cools the transmission 13 and (ii) the transmission efficiency η trm and the transmission 13 is depicted.

As shown in FIG. 15, solid lines L31, L32, and L33 are cooling oil temperatures from higher to lower. That is, the transmission efficiency η trm decreases, as the temperature of cooling oil lowers.

According to the present embodiment, with reference to the maps shown in FIGS. 14 and 15, the transmission efficiency η trm is computed based on the gear ratio, the input torque, and the temperature of the cooling oil.

Figure 16:
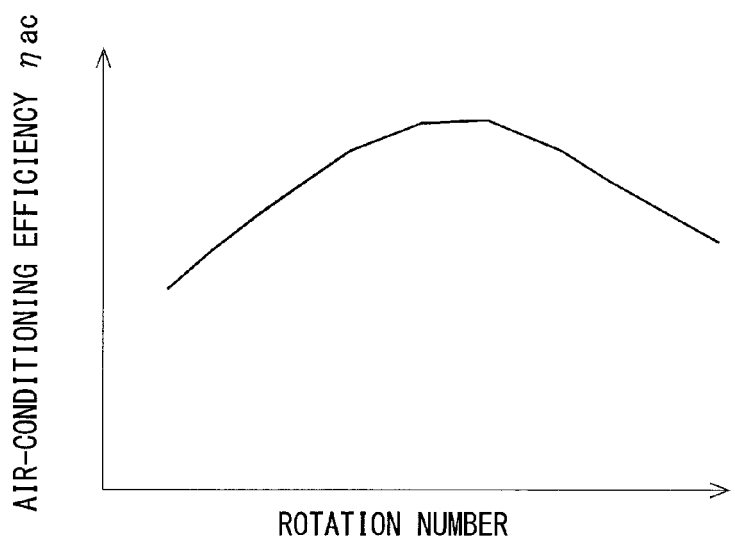
FIG. 16 is an illustration diagram of an air-conditioning efficiency in the second embodiment of the present disclosure.

The air-conditioning efficiency η ac is described based on FIG. 16.

The air-conditioning efficiency η ac of the present embodiment is a ratio between (i) an input electric power of the air-conditioning electric compressor 42 and an output electric power.

FIG. 16 shows a map by which a relationship between (i) the number of rotation of the air-conditioning electric compressor 42 and (ii) the air-conditioning efficiency η ac is depicted.

As shown in FIG. 16, the air-conditioning efficiency η ac changes according to the number of rotation of the air-conditioning electric compressor 42. According to the present embodiment, with reference to the map shown in FIG. 16, the air-conditioning efficiency η ac is computed based on the number of rotation of the air-conditioning electric compressor 42.

Figure 17:
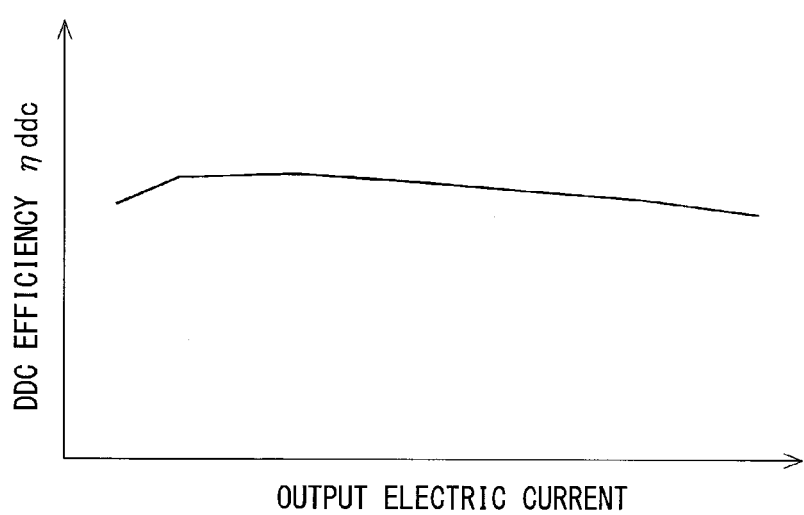
FIG. 17 is an illustration diagram of a DDC efficiency in the second embodiment of the present disclosure.

The DDC efficiency η ddc is described based on FIG. 17.

FIG. 17 shows a map by which a relationship between (i) an output electric current of the DC/DC converter 33 and (ii) the DDC efficiency η ddc is depicted.

As shown in FIG. 17, the DDC efficiency η ddc changes according to the output electric current of the DC/DC converter 33. According to the present embodiment, with reference to the map shown in FIG. 17, the DDC efficiency η ddc is computed based on the output electric current of the DC/DC converter 33.

Figure 18:
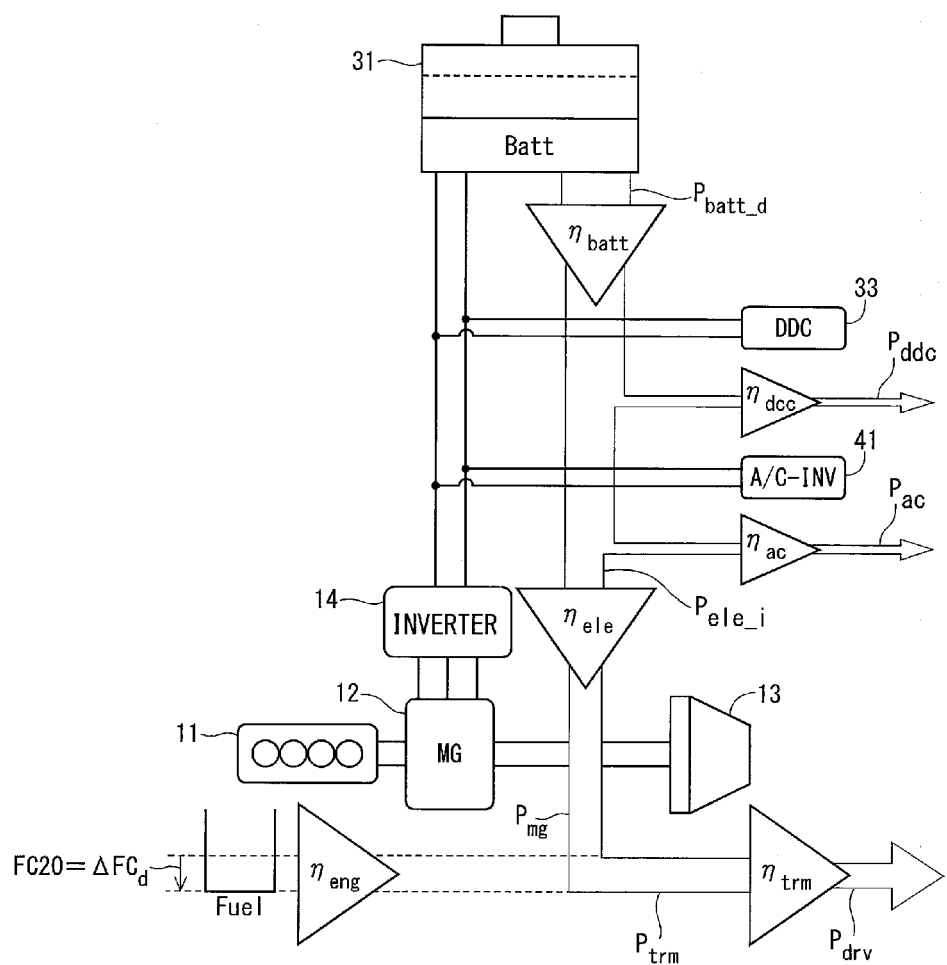
FIG. 18 is an illustration diagram of the EV effect in the second embodiment of the present disclosure.
Figure 19:
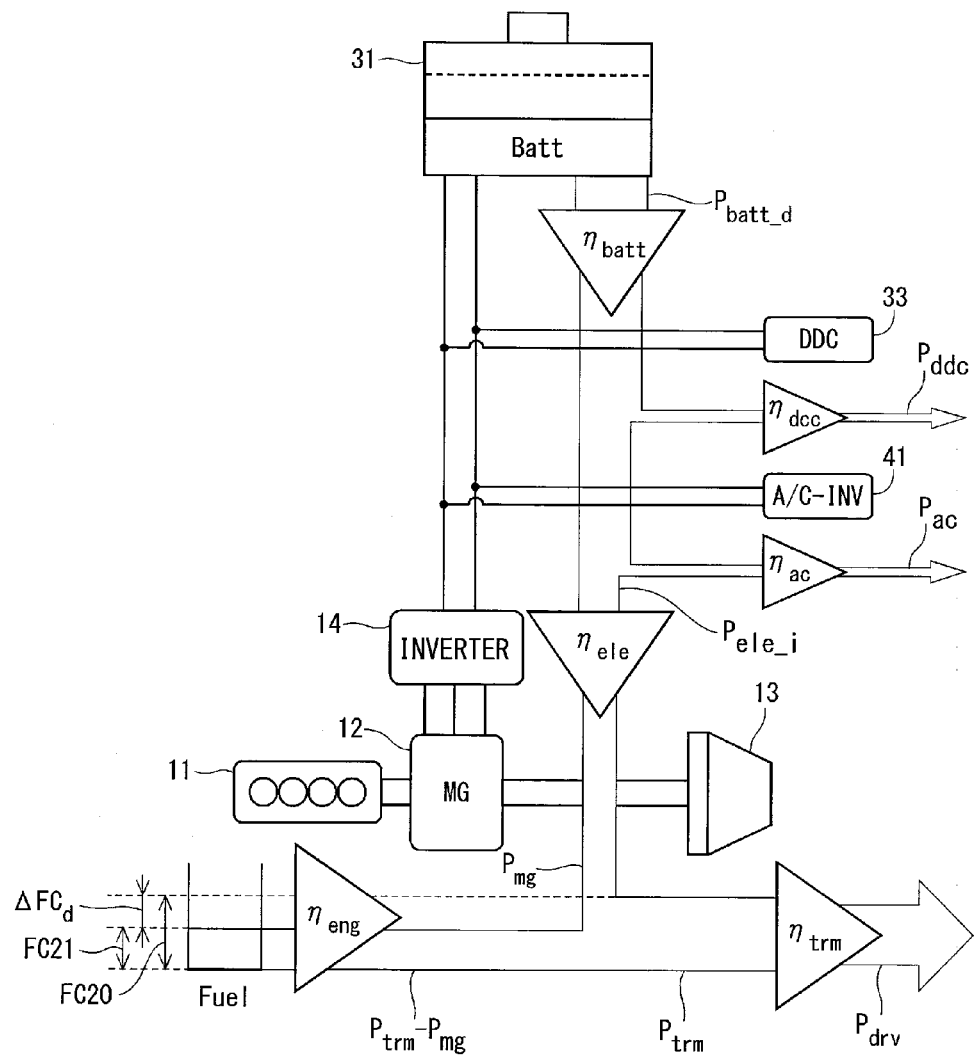
FIG. 19 is an illustration diagram of the MG assist effect in the second embodiment of the present disclosure.
Figure 20:
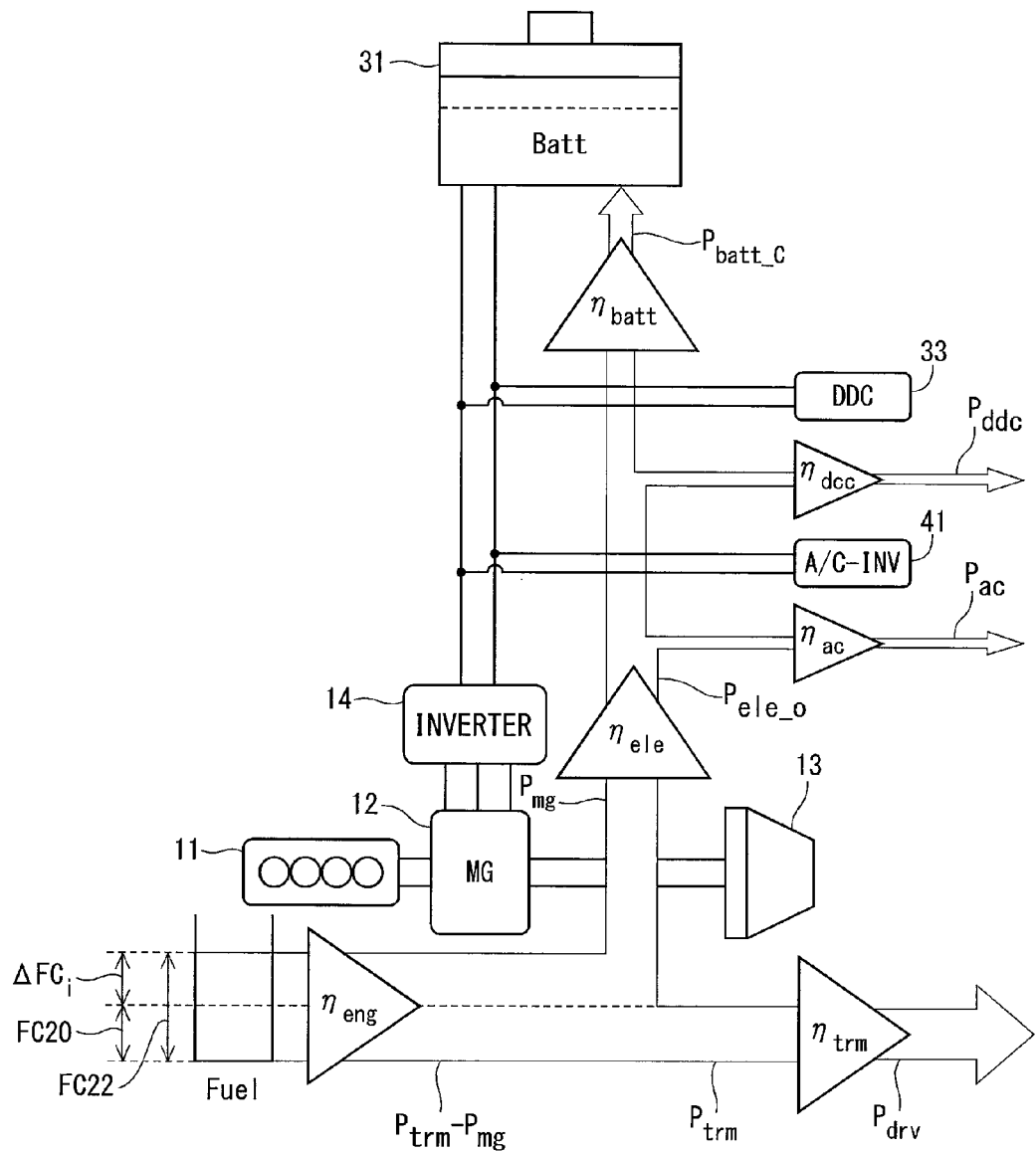
FIG. 20 is an illustration diagram of the electricity generation cost in the second embodiment of the present disclosure.

Then, the calculation methods of the EV effect, the MG assist effect, and the engine generation cost are described based on FIGS. 18-20.

The control section 20 and other parts are omitted from FIGS. 18-20.

FIG. 18 is a diagram illustrating the EV effect.

The MG power Pmg is represented by a following Equation (16) using an inverter input electric power Pele_i inputted to the inverter 14.

$$P_{tmr} = P_{ele\_i} \times \eta_{ele}(P_{mg}) \quad \text{Equation (16)}$$

In the EV travel mode, a fuel consumption FC20 in the case of providing a transmission input control power Ptrm inputted into the transmission 13 as the engine power Peng generated by the drive of the engine 11 is the fuel consumption decrease ΔFCd. When providing a transmission input control power Ptrm inputted into the transmission 13 as the engine power Peng generated by the drive of the engine 11, the transmission input control power Ptrm is represented by a following Equation (17).

$$P_{trm} = \Delta FC_d \times \rho \times \eta_{eng}(P_{trm}) \quad \text{Equation (17)}$$

Further, the transmission input control power Ptrm is computed by a following Equation (18) from the requested drive power Pdrv.

$$P_{trm} = P_{drv} / \eta_{trm} \quad \text{Equation (18)}$$

Since the transmission input control power Ptrm and the MG power Pmg are equal in the EV travel mode, when the term Ptrm in the Equation (17) is set to Pmg, the fuel consumption decrease ΔFCd per inverter input electric power Pele_i is represented by a following Equation (19) based the Equations (16) and (18).

$$\frac{\Delta FC_d}{P_{ele\_i}} = \frac{\eta_{ele}(P_{mg})}{\eta_{eng}(P_{mg})} \times \frac{1}{\rho} \quad \text{Equation (19)}$$

Further, a consumed electric power Pbatt_d of the main battery 31 is represented by a following Equation (20).

$$P_{batt\_d} = (P_{mg} + P_{ddc}/\eta_{ddc} + P_{ac}/\eta_{ac})/\eta_{batt} \quad \text{Equation (20)}$$

By using the Equations (19) and (20), the EV effect which is the fuel consumption decrease ΔFCd per consumed electric power Pbatt_d is computable.

Therefore, the EV effect is computable based on the battery efficiency η batt, the transmission efficiency η trm, the air-conditioning efficiency η ac, and the DDC efficiency η ddc in addition to the engine efficiency η eng and the MG-INV efficiency η ele.

FIG. 19 is a diagram illustrating the MG assist effect.

In the MG assist mode, a difference between (i) a fuel consumption FC20 in the case of outputting the transmission input control power Ptrm from the engine 11 and (ii) a fuel consumption FC21 in the case of outputting a result of subtraction of the MG power Pmg from the transmission input control power Ptrm as the power from the engine 11 is the fuel consumption decrease ΔFCd.

The fuel consumption decrease ΔFCd is represented by a following Equation (21).

$$\Delta FC_d = \frac{P_{trm}}{\eta_{eng}(P_{trm})} \times \frac{1}{\rho} - \frac{P_{trm} - P_{mg}}{\eta_{eng}(P_{trm} - P_{mg})} \times \frac{1}{\rho} \quad \text{Equation (21)}$$

The fuel consumption decrease ΔFCd per inverter input electric power Pele_i is represented by a following Equation (22).

$$\frac{\Delta FC_d}{P_{ele\_i}} = \left\{ \frac{P_{trm}}{\eta_{eng}(P_{trm})} - \frac{P_{trm} - P_{mg}}{\eta_{eng}(P_{trm} - P_{mg})} \right\} \times \frac{\eta_{ele}(P_{mg})}{P_{mg} \times \rho} \quad \text{Equation (22)}$$

By using the Equation (22) and the Equation (20), the MG assist effect which is the fuel consumption decrease ΔFCd per consumed electric power Pbatt_d is computable.

Therefore, the MG assist effect is computable based on the battery efficiency η batt, the transmission efficiency η trm, the air-conditioning efficiency η ac, and the DDC efficiency η ddc in addition to the engine efficiency η eng and the MG-INV efficiency η ele.

FIG. 20 is a diagram illustrating the engine generation cost.

In the engine generation mode, a part of the engine power Peng is used for the drive of the motor generator 12, and the electric power generated by the drive of the motor generator 12 is outputted to the main battery 31 from the inverter 14.

An inverter output electric power Pele_o outputted to the main battery 31 from the inverter 14 is represented by a following Equation (23).

$$P_{ele\_o} = P_{mg} \times \eta_{ele}(P_{mg}) \quad \text{Equation (23)}$$

In the engine generation mode, a difference between (i) the fuel consumption FC20 in the case of outputting the transmission input control power Ptrm from the engine 11 and (ii) a fuel consumption FC22 in the case of outputting an added power from the engine 11, which is a total of the MG power Pmg added to the transmission input control power Ptrm, is the fuel consumption increase ΔFCi. The fuel consumption increase ΔFCi is represented by a following Equation (24).

$$\Delta FC_i = \frac{P_{trm}}{\eta_{eng}(P_{trm})} \times \frac{1}{\rho} + \frac{P_{trm} + P_{mg}}{\eta_{eng}(P_{trm} + P_{mg})} \times \frac{1}{\rho} \quad \text{Equation (24)}$$

The fuel consumption increase ΔFCi(s) per inverter output electric power Pele_o is represented by a following Equation (25) based on the Equations (23) and (24).

$$\frac{\Delta FC_i}{P_{ele\_o}} = \left\{ -\frac{P_{trm}}{\eta_{eng}(P_{trm})} + \frac{P_{trm} + P_{mg}}{\eta_{eng}(P_{trm} + P_{mg})} \right\} \times \frac{1}{P_{mg} \times \eta_{ele}(P_{mg}) \times \rho} \quad \text{Equation (25)}$$

Further, a charge electric power Pbatt_c of the main battery 31 is represented by a following Equation (26).

$$P_{batt\_c} = (P_{ele\_c} - P_{ddc}/\eta_{ddc} - P_{ac}/\eta_{ac})/\eta_{batt} \quad \text{Equation (26)}$$

By using the Equation (25) and the Equation (26), an engine generation cost which is the fuel consumption increase $\Delta FCi$ per charge electric power $Pbatt\_c$ is computable.

Therefore, the engine generation cost is computable based on the battery efficiency $\eta$ batt, the transmission efficiency $\eta$ trm, the air-conditioning efficiency $\eta$ ac, and the DDC efficiency $\eta$ ddc in addition to the engine efficiency $\eta$ eng and the MG-INV efficiency $\eta$ ele.

Figure 21:
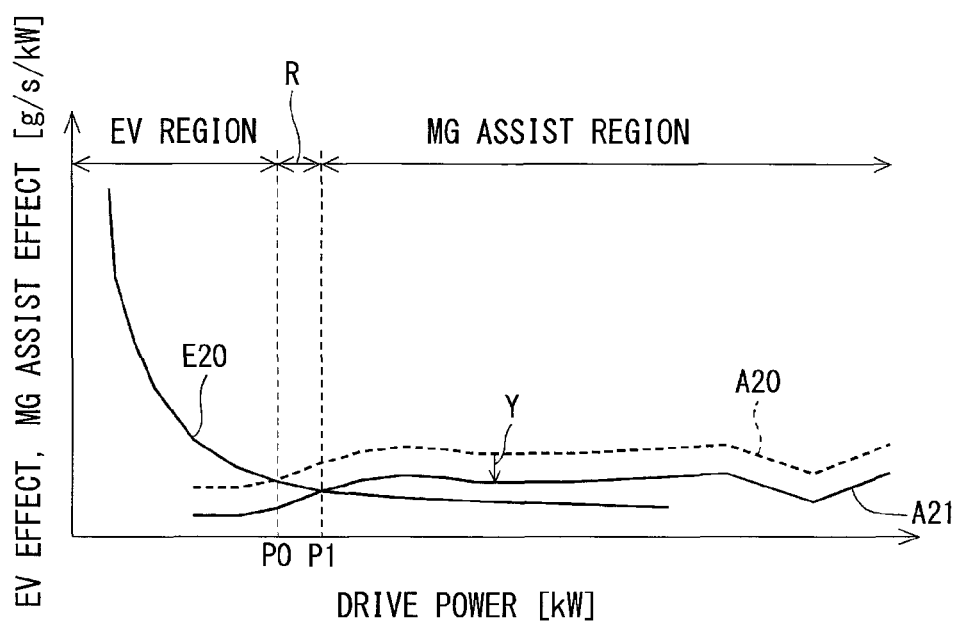
FIG. 21 is an illustration diagram of a relationship between the EV effect and the MG assist effect in the second embodiment of the present disclosure.

A concrete example of the EV effect and the MG assist effect is shown in FIG. 21.

In the EV travel mode, when the accessory device requested power is not zero, the consumed electric power $Pbatt\_d$ of the main battery 31 increases as compared with the case where the accessory device requested power is zero. However, even when the accessory device requested power changes, the MG power Pmg does not change. Therefore, as shown by a solid line E20, the EV effect does not change irrespective of whether there is the accessory device requested power or not.

On the other hand, in the MG assist mode, when the consumed electric power $Pbatt\_d$ has a restriction due to the SOC state of the main battery 31 and other conditions, the MG power Pmg decreases according to the amount of the accessory device requested power. Therefore, as shown by an arrow Y, the MG assist effect in the case of having a non-zero accessory device requested power represented by a solid line A21 becomes smaller as compared with the MG assist effect in the case of having a zero accessory device requested power represented by a dashed line A20.

Further, in case that the accessory device requested power is zero, the EV region is defined as a region where the drive power is equal to or smaller than P0, because the MG assist effect surpasses the EV effect when the drive power is P0, and the travel mode is set to the EV travel mode in the EV region. Further, a region where the drive power is equal to or greater than P0 is defined as the MG assist region, and the travel mode is set to the MG assist mode in the MG assist region.

On the other hand, because the EV effect surpasses the MG assist effect when the drive power is P1 in case that the accessory device requested power is not zero, the EV region is defined as a region where the drive power is equal to or smaller than P, and the travel mode is set to the EV travel mode in the EV region. Further, a region where the drive power is equal to or greater than P1 is defined as the MG assist region, and the travel mode is set to the MG assist mode in the MG assist region.

That is, in other words, in a region R where the drive power is equal to or greater than P0 and is equal to or smaller than P1, the "efficient" travel mode changes, which provides a greater fuel consumption efficiency. According to the present embodiment, since the EV effect and the MG assist effect are calculated in consideration of the load request electric power etc., a threshold of the drive power concerning the switching between the EV travel mode and the MG assist mode varies depending on the accessory request electric power and the like. Therefore, the selection of the travel modes is determined as a totality of the vehicle control system 2 in consideration of and including the accessory device requested power etc., the fuel consumption decrease effect is expected to be greater than an accessory device request non-consideration scheme.

In the present embodiment, in addition to the consideration of the engine efficiency $\eta$ eng and the MG-INV efficiency $\eta$ ele, the fuel consumption decrease or the fuel consumption increase is computed for every travel mode, based on at least one of the battery efficiency $\eta$ batt which is an efficiency of the main battery 31, the transmission efficiency $\eta$ trm which is an efficiency of the transmission 13, the air-conditioning efficiency $\eta$ ac which is an efficiency of the air-conditioning driven either by the electric power from the main battery 31 or from the sub battery 32, the DDC efficiency $\eta$ ddc(s) which is an efficiency of the DC/DC converter 33 that converts the electric power supplied to the accessory load 40 from the main battery 31.

In such manner, the fuel consumption decrease or the fuel consumption increase can be computed more appropriately. Further, the fuel consumption efficiency is expected to be further improved by selecting a travel mode based on the computed fuel consumption decrease or the computed fuel consumption increase. Further, the same effects as the above-mentioned embodiment is also expected.

Other Embodiments (a) According to the above-mentioned embodiment, the first clutch is provided in between the engine and the motor generator. In other embodiments, in addition to the first clutch, a drive power transmission device such as a belt, a gear, a chain and the like may be disposed in between the engine and the motor generator, and three engine and the motor generator may be connected via such drive power transmission device. Further, as long as the engine rotation number and the MG rotation number are configured to have a certain ratio, the drive power transmission device may have a deceleration unit and/or an acceleration unit. Further, the first clutch may be omitted.

(b) Although the transmission in the above-mentioned embodiment is a continuously variable transmission, the transmission may be provided as a multi-speed transmission in other embodiments. When the transmission is a multi-speed transmission, the ideal fuel consumption information is set up according to the number of speeds.

(c) According to the first embodiment described above, the EV effect, the MG assist effect, and the engine generation cost are computed by using the Equations (4), (8), and (12). In other embodiments, the computation results from the Equations (4), (8), and (12) may be stored as a map in advance, and a map operation may be used to compute the EV effect, the MG assist effect, and the engine generation cost. In such case, the map may be generated by using other devices. The same applies to the second embodiment.

Further, in the above-mentioned embodiment, a calculation of the engine generation cost may be omitted, because the engine generation cost is not used for the selection of the travel modes.

(d) According to the second embodiment, the battery efficiency $\eta$ batt, the transmission efficiency $\eta$ trm, the air-conditioning efficiency $\eta$ ac, and the DDC efficiency $\eta$ ddc are used for the calculation of the fuel consumption decrease, or the fuel consumption increase. In other embodiments, one or more of the battery efficiency $\eta$ batt, the transmission efficiency $\eta$ trm, the air-conditioning efficiency $\eta$ ac, and the DDC efficiency $\eta$ ddc may be omitted from such calculation of the fuel consumption decrease/increase. For such omission of one or more of the various efficiencies, an efficiency value in the equations of the second embodiment is set to 1. Further, as the efficiency of the accessory load, other efficiencies other than the air-conditioning efficiency $\eta$ ac may also be taken into consideration. Further, an efficiency of the sub battery may also be taken into consideration.

(e) In the above-mentioned embodiment, the vehicle control apparatus is provided as having one control section. In other embodiments, the vehicle control apparatus may be provided as having many control sections, such as an engine control section that controls an engine, and an MG control section that controls a motor generator, for example.

(f) In the above-mentioned embodiment, an electricity storage part is constituted by the secondary battery. In other embodiments, the electricity storage part may be replaced with other device, as long as it is chargeable and dischargeable, such as an electric double layer capacitor, or the like.

Although the present disclosure has been fully described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. A vehicle control apparatus for controlling a hybrid vehicle that includes an engine, a motor generator rotating at a predetermined rotation ratio with a rotation of the engine when connected to the engine, an electricity storage part receiving and sending an electric power to and from the motor generator, an inverter positioned between the electricity storage part and the motor generator, and a transmission transmitting a drive power from the engine and the motor generator to a drive wheel, the vehicle control apparatus comprising:
   an engine efficiency calculator calculating an engine efficiency based on ideal fuel consumption information and an engine power, which is a drive power output from the engine;
   an MG-INV efficiency calculator calculating an MG-INV efficiency, which is a combined efficiency of the motor generator and the inverter based on an MG power, which is a drive power being output from the motor generator; and
   an electric power efficiency calculator calculating a fuel consumption decrease or a fuel consumption increase for travel modes based on the engine efficiency and the MG-INV efficiency.

2. The vehicle control apparatus of claim 1, wherein
the electric power efficiency calculator calculates the fuel consumption decrease or the fuel consumption increase based at least on one of the engine efficiency, the MG-INV efficiency, an efficiency of the electricity storage part, an efficiency of the transmission, an efficiency of a load on an accessory device that is powered by the electricity storage part or an accessory power source, or an efficiency of a converter that converts the electric power supplied from the electricity storage part to the load on the accessory device.

3. The vehicle control apparatus of claim 1, wherein
the electric power efficiency calculator calculates at least one of
   an EV effect, which is the fuel consumption decrease when a travel mode is an EV travel mode, in which the MG power is output as a requested drive power that is calculated based on driver operation information and vehicle speed information,
   an MG assist effect, which is the fuel consumption decrease when the travel mode is an MG assist mode, in which the MG power and the engine power are output as the requested drive power, or
   an engine generation cost, which is the fuel consumption increase when the travel mode is an engine generation mode, in which the requested drive power is output as the engine power and the engine power is used to drive the motor generator to generate electricity.

4. The vehicle control apparatus of claim 3, further comprising:
   a travel mode selector selecting one of the travel modes as the travel mode based on (i) a calculation of the EV effect and the MG assist effect by the electric power efficiency calculator and (ii) a comparison between the EV effect and the MG assist effect.

5. The vehicle control apparatus of claim 1, wherein
an MG rotation number is a number of rotations of the motor generator, and the MG-INV efficiency calculator calculates (i) the MG rotation number based on an engine rotation number that is derived from the engine power and the ideal fuel consumption information, and (ii) the MG-INV efficiency based on the MG rotation number and the MG power.

6. The vehicle control apparatus of claim 1, wherein
the transmission is a continuously variable transmission.

* * * * *